No. 830,950. PATENTED SEPT. 11, 1906.
G. WISHART.
PHOTOGRAPHIC PLATE OR FILM HOLDER.
APPLICATION FILED FEB. 6, 1906.

2 SHEETS—SHEET 1.

WITNESSES
Paul A. Blair
Madge E. Keir

INVENTOR
George Wishart
BY
Howson and Howson
ATTORNEYS.

No. 830,950. PATENTED SEPT. 11, 1906.
G. WISHART.
PHOTOGRAPHIC PLATE OR FILM HOLDER.
APPLICATION FILED FEB. 6, 1906.
2 SHEETS—SHEET 2.
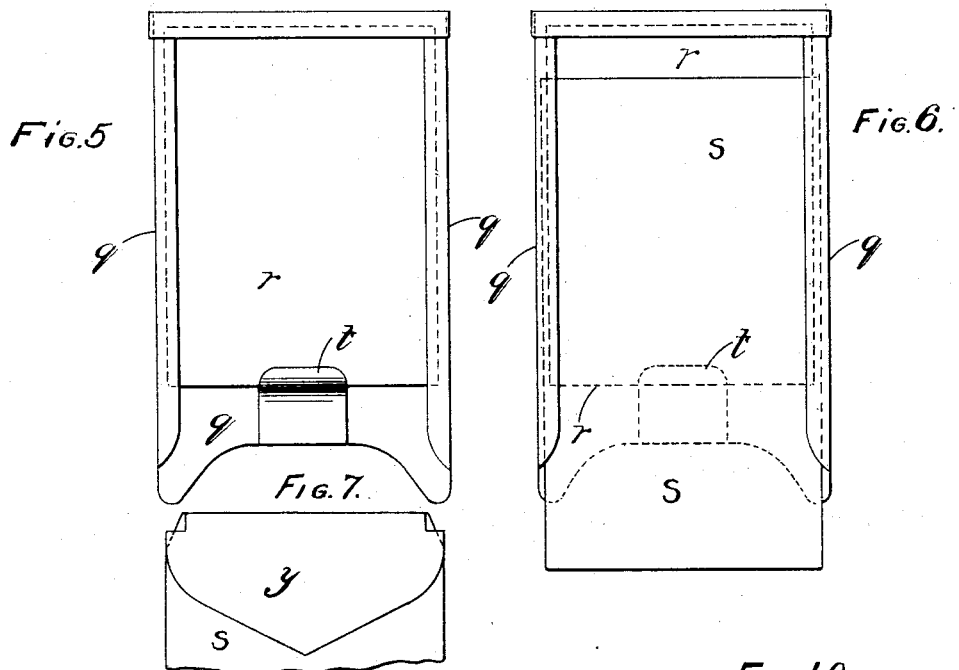
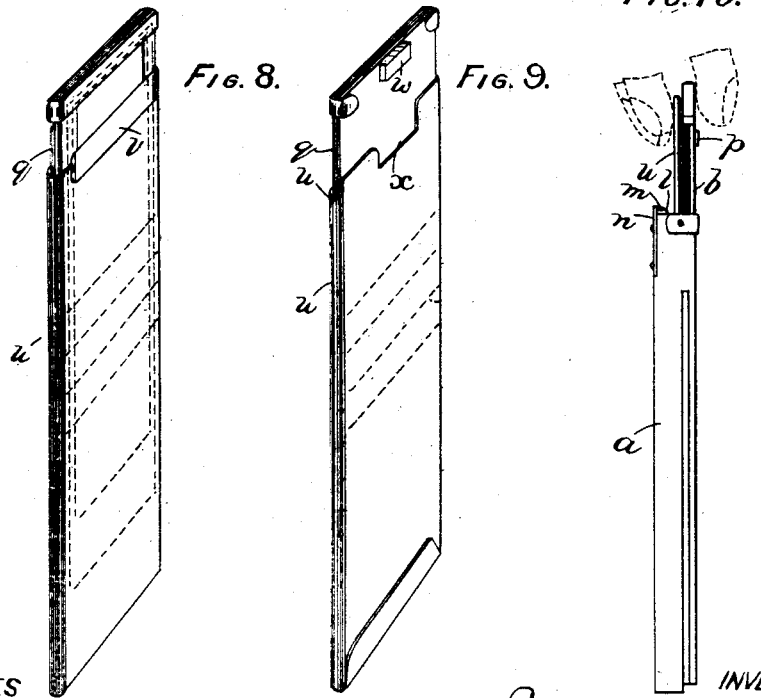
WITNESSES
Paul A. Blair.
Madge E. Keir.
INVENTOR
George Wishart
BY Howson and Howson
ATTORNEYS.

UNITED STATES PATENT OFFICE.

GEORGE WISHART, OF CAMBUSLANG, SCOTLAND.

PHOTOGRAPHIC PLATE OR FILM HOLDER.

No. 830,950. Specification of Letters Patent. Patented Sept. 11, 1906.

Application filed February 6, 1906. Serial No. 299,755.

*To all whom it may concern:*

Be it known that I, GEORGE WISHART, camera-maker, a subject of the King of Great Britain and Ireland, and a resident of Cambuslang, Scotland, have invented a certain Photographic Plate or Film Holder, of which the following is a specification, and for which I have obtained a patent in Great Britain, No. 15,958, bearing date August 4, 1905.

This invention has reference to means for carrying and exposing dry sensitive photographic plates or films in the camera, and comprises improvements in plate-holders and light-tight envelops, according to which sensitive plates or films may be placed within the envelops in any ordinary dark room, may be carried in the pocket of the user or in any convenient manner, and after exposure in the camera be returned to the pocket to be afterward developed in the dark room.

In order that others skilled in the art to which my invention relates may understand how the same is to be carried into effect or practice, I have hereunto appended two sheets of drawings, in which—

Figure 1:
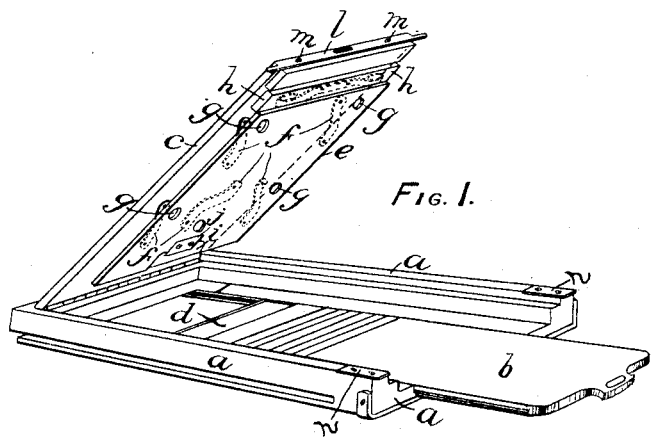
Figure 2:
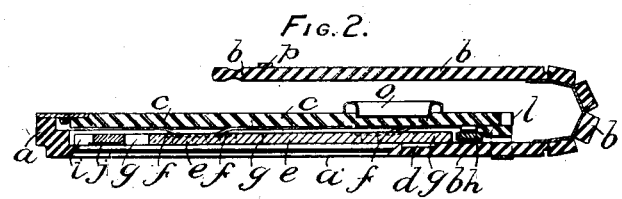
Figure 3:
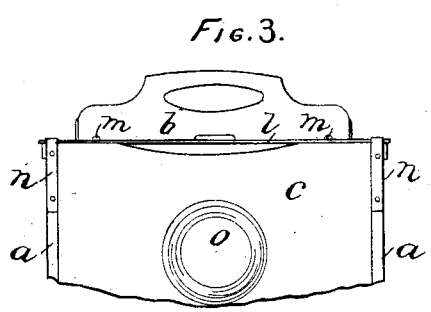
Figure 4:
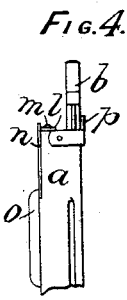

Figure 1 is a perspective view of a plate-holder for exposing plates or films in the camera with the hinged door open. Fig. 2 is a longitudinal section of same with the sliding door open. Both are empty. Fig. 3 is a side view of the upper part of a plate-holder. Fig. 4 is an edge view of same. Fig. 5 is a plan of the inner envelop with the plate or film inserted. Fig. 6 is a plan of same, showing the covering paper sheet partly drawn over the film. Fig. 7 illustrates the form of the covering-sheet when plates are used. Fig. 8 shows the inner envelop partly inserted in the outer envelop. Fig. 9 shows the other side of envelop. Fig. 10 illustrates the mode of use.

Referring to Figs. 1 to 4, $a$ is a rectangular frame grooved for sliding into the camera and fitted with a sliding door $b$, made flexible in the usual manner, and a hinged door $c$, which is opened when it is desired to insert a plate or film inclosed in a light-tight envelop. The sliding door $b$ is made flexible in the well-known manner illustrated and is formed with a transverse groove $d$, which receives and engages with the wooden bar $v$, Fig. 8, secured on the outer cover of the light-tight envelop when this is placed within the plate-holder. The hinged door $c$ is fitted with a compensating spring-plate $e$, which presses on the envelop to keep it in position whether it contains a plate or a thinner film. This plate $e$ is carried by springs $f$, and holes $g$ are formed in the plate to permit of access to the screws securing the springs. A spring-supported cross-bar $h$, faced with velvet, is fitted to make a light-tight joint with the door $b$ when the plate or film is inserted. A notch $i$ is formed in the plate $e$, in which a small adjusting and wearing plate $j$ is secured to engage with the block $w$, Fig. 9, on the inner envelop $q$ to prevent it being drawn out when the door $b$ is drawn out to pull out the outer envelop $u$ along with it. The hinged door $c$ is held in its closed position by the spring-plate $l$, secured at $m$ $m$ to the door and engaging with the stop-pieces $n$. To open the door $c$, the spring-plate $l$ is pressed down at its center part, a part of the door $c$ being cut away to allow of this action, which raises the ends high enough to clear the stop-pieces $n$ and allow the door to open. The ring $o$ is for the purpose of giving the thumb a hold while sliding the holder into and out of the camera. $p$ is a bar to act as a stop when closing the door $b$.

Referring to Figs. 5 to 9, Figs. 5 and 6 illustrate the inner envelop $q$, having the plate or film $r$ placed in position. This envelop consists of a sheet of stiff paper having three edges turned over to form a groove, into which the covering-sheet $s$, of stiff paper, is slipped over the plate. A tongue-piece $t$, also of paper, is used to prevent the plate coming out. When a plate is used, it is preferred instead of inserting the covering-sheet $s$ in the side grooves to make it slide on the top of them, in which case the covering-sheet $s$ is formed with a flap $y$, such as is shown by Fig. 7, to facilitate the entry of its inner end into the end groove of the inner envelop.

Figs. 8 and 9 illustrate the two sides of the outer envelop $u$, into which the inner envelop $q$ is slipped. As stated, the bar $v$ engages with the groove $d$ in the door $b$ of the dark cell and the block $w$ with the notch $i$ in the plate $e$ on door $c$. The paper of the outer envelop is creased on both sides to enable it to bend along with the flexible door. The bar $v$ is beveled on one side to assist it to slide over the end groove of the inner envelop without catching on it and also to form a light-tight joint.

In use the plate or film is placed in the inner envelop $q$ and the covering-sheet $s$ slipped over it. The inner envelop is then slipped within the outer envelop $u$, the open end first, and pressed in until the block $w$ enters the notch $x$ in the outer envelop. The envelop is then placed in the plate-holder after opening the door $c$, with the block $v$ in the groove $d$, and the door shut. The cell being placed in the camera, the exposure is made by drawing the door $b$ and the outer envelop $u$ also, also the cover $s$ gripped together as shown by Fig. 10. When exposed, the door is returned, and the outer envelop again covers the plate, which may then be removed in its envelop and placed in user's pocket and another one be placed in the dark cell.

What I claim is—

1. In means for carrying and exposing dry sensitive photographic plates or films in the camera, the combination comprising a plate-holder fitted with a flexible sliding door having a transverse groove therein, a hinged door fitted with a spring-actuated plate on its inner side having a notch therein, also a spring-actuated cross-bar to make a light-tight joint, and a duplex envelop comprising an inner envelop with sliding covering-sheet and a block thereon to engage with the notch in the spring-plate, and an outer creased envelop with a beveled block thereon to engage with the transverse groove in the sliding door substantially as herein set forth.

2. In means for carrying and exposing dry sensitive photographic plates or films in the camera a plate-holder for use with a light-tight envelop of the kind described comprising in combination a rectangular frame fitted with a flexible sliding door having a transverse groove therein, a hinged door, held in its closed position by a spring-catch, having a spring-actuated plate on its inner side with a notch therein, also a spring-actuated plate to make a light-tight joint, substantially as set forth.

3. In means for carrying and exposing dry sensitive photographic plates or films in the camera a plate-holder comprising in combination a rectangular frame fitted with a flexible sliding door having a transverse groove therein, a hinged door, having a spring-actuated plate on its inner side with a notch therein, also a spring-actuated bar to make a light-tight joint, substantially as set forth.

4. In means for carrying and exposing dry sensitive photographic plates or films the combination with a plate-holder having a hinged door fitted with a spring-actuated plate of a securing spring-plate secured on the outer edge of the door and engaging with stops on the holder substantially as set forth.

5. In means for carrying and exposing dry sensitive photographic plates or films in a camera, the combination of a plate-holder having a hinged door provided with a notch, a duplex light-tight envelop having an inner grooved envelop with sliding covering-sheet having a block thereon which engages said notch, an outer envelop creased to bend and provided with a beveled block, and a flexible sliding door for the plate-holder having a groove to receive said beveled block, substantially as set forth.

In testimony whereof I have signed my name to this specification in the presence of two subscribing witnesses.

GEORGE WISHART.

Witnesses:
R. C. THOMSON,
WM. RUTHERFORD.